(12) United States Patent
Huang

(10) Patent No.: US 9,482,806 B2
(45) Date of Patent: Nov. 1, 2016

(54) BACKLIGHT FOR LIQUID CRYSTAL DISPLAY DEVICE HAVING A REFLECTOR BEING COATED WITH A GRADATION COLOR LAYER COMPOSED BY YELLOW

(71) Applicant: Shenzhen China Star Optoelectronics Technology Co., Ltd., Shenzhen, Guangdong (CN)

(72) Inventor: Jianfa Huang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/929,258

(22) Filed: Oct. 31, 2015

(65) Prior Publication Data

US 2016/0062026 A1    Mar. 3, 2016

Related U.S. Application Data

(62) Division of application No. 13/512,347, filed on May 28, 2012, now Pat. No. 9,201,269.

(51) Int. Cl.
*G02F 1/1335*    (2006.01)
*F21V 8/00*    (2006.01)

(52) U.S. Cl.
CPC .......... *G02B 6/0043* (2013.01); *G02B 6/0035* (2013.01); *G02B 6/0055* (2013.01); *G02B 6/0061* (2013.01); *G02B 6/0068* (2013.01); *G02F 1/133605* (2013.01); *G02F 1/133615* (2013.01); *G02B 6/0073* (2013.01); *G02F 2001/133614* (2013.01)

(58) Field of Classification Search
CPC combination set(s) only.
See application file for complete search history.

(56) References Cited

U.S. PATENT DOCUMENTS 6,345,899 B1 * 2/2002 Ohkawa .............. G02B 6/0038
349/61

* cited by examiner

*Primary Examiner* — Lauren Nguyen
(74) *Attorney, Agent, or Firm* — Andrew C. Cheng

(57) ABSTRACT

A backlight module includes a light source, a waveguide, a reflector, and an optical film. The waveguide includes a light inlet surface facing the light source, a light emitting surface adjacent to the light inlet surface, and a bottom surface opposite to the light emitting surface. The reflector is disposed under the bottom surface of the waveguide. The optical film is disposed above the light emitting surface of the waveguide. The reflector is coated with a gradation color layer composed by yellow graduating to blue so as to ensure projection of light from the light source is homogeneous with reduced chromatic aberration.

10 Claims, 6 Drawing Sheets

BACKLIGHT FOR LIQUID CRYSTAL DISPLAY DEVICE HAVING A REFLECTOR BEING COATED WITH A GRADATION COLOR LAYER COMPOSED BY YELLOW

CROSS REFERENCE TO RELATED APPLICATIONS

This is a divisional application of co-pending patent application Ser. No. 13/512,347, "Backlight for Liquid Crystal Display Device Having a Reflector Being Coated with a Graduation Color Layer Composed by Yellow Graduating to Blue", filed on May 28, 2012.

BACKGROUND OF THE INVENTION

1. Field of the Invention

The present invention relates to a technical field of liquid crystal display, and more particularly to a backlight module and liquid crystal display module.

2. the Related Arts

Liquid crystal filled in a liquid crystal display (LCD) panel does not emit light, and it needs a backlight module to light up so as to clearly display the patterns to be displayed on the LCD panel. The arrangement of a light source in backlight module can be referred to as either a direct type or a side-edge type.

In the side-edge type backlight module, a chromatic aberration could be encountered since a printing pattern on a waveguide will absorb light. In addition, different bins of the LED will also attribute the chromatic aberration. This chromatic aberration will become worse as the dimension of the LCD panel becomes larger.

It is therefore an objective of this invention to provide a technical solution to address the prior art problems.

SUMMARY OF THE INVENTION

It is an objective of this invention to provide a backlight module and a LCD device in which chromatic aberration can be reduced to its lowest level so as to achieve homogeneousness on the light beam projected from the backlight module.

In order to resolve the prior art technical issues, the present invention provides a backlight module, which comprises a light source and a waveguide including an light inlet surface facing the light source, an light emitting surface adjacent to the light inlet surface, and a bottom surface opposite to the light emitting surface. A reflector is disposed under the bottom surface of the waveguide. An optical film is disposed above the light emitting surface of the waveguide. The reflector is coated with a gradation color layer composed by yellow graduating to blue, wherein the percentage of blue pigment proportionally increases with the distance from the light source. The bottom surface of the waveguide includes a printing pattern that is formed by mixing ink and pigment. And, the percentage of the pigment within the printing pattern changes proportionally with respect to the distance from the light source.

In the above-described backlight module, when the pigment of the printing pattern is blue pigment, the percentage of the blue pigment within the printing pattern increases proportionally with the distance from the light source. Alternatively, when the pigment is yellow pigment, the percentage of the yellow pigment within the printing pattern decreases proportionally with the distance from the light source.

In order to resolve the prior art technical issues, the present invention provides a backlight module, which comprises a light source and a waveguide including an light inlet surface facing the light source, an light emitting surface adjacent to the light inlet surface, and a bottom surface opposite to the light emitting surface. A reflector is disposed under the bottom surface of the waveguide. An optical film is disposed above the light emitting surface of the waveguide. The reflector is coated with a gradation color layer composed by yellow graduating to blue.

The percentage of blue pigment of the graduation color layer proportionally increases with distance from the light source.

The bottom surface of the waveguide includes an ink printing pattern and a color compensation pattern, wherein when the color compensation pattern comprises blue fluorescent pigment, the percentage of the blue fluorescent pigment increases proportionally with the distance from the light source; and alternatively, when the color compensation pattern comprises yellow fluorescent pigments, the percentage of the yellow fluorescent pigment decreases proportionally with the distance from the light source.

The printing pattern is composed of spaced dots that are of a fixed size.

The printing pattern and the color compensation pattern are configured into a single layer configuration, and the printing pattern and the color compensation pattern are alternatively arranged across the bottom surface of the waveguide.

Alternatively, the printing pattern and the color compensation pattern are stacked into two layers, wherein the color compensation pattern is arranged on a first layer of the bottom surface of the waveguide and the ink printing pattern is located on a second layer of the bottom surface of the waveguide.

Alternatively, the printing pattern and the color compensation pattern are stacked into two layers, wherein the ink printing pattern is located on a first layer of the bottom surface of the waveguide and the color compensation pattern is arranged on a second layer of the bottom surface of the waveguide.

The bottom surface of the waveguide includes a pattern composed of ink and color pigment, and the percentage of the pigment within the printing pattern changes proportionally with respect to the distance from the light source.

When the pigment of the printing pattern is blue pigment, the percentage of the blue pigment within the printing pattern increases proportionally with the distance from the light source; and alternatively, when the pigment is yellow pigment, the percentage of the yellow pigment within the printing pattern decreases proportionally with the distance from the light source.

In order to resolve the prior art technical issues, the present invention provides a liquid crystal display device, which includes a liquid crystal display panel. The device further includes a backlight module, which includes a light source and a waveguide including a light inlet surface facing the light source, a light emitting surface adjacent to the light inlet surface, and a bottom surface opposite to the light emitting surface. A reflector is disposed under the bottom surface of the waveguide. An optical film is disposed above the light emitting surface of the waveguide. The reflector is coated with a gradation color layer composed by yellow graduating to blue.

The gradation color layer includes blue pigment, and the percentage of the blue pigment proportionally increases with distance from the light source.

The bottom surface of the waveguide includes an ink printing pattern and a color compensation pattern, wherein when the color compensation pattern comprises blue fluorescent pigment, the percentage of the blue fluorescent pigment increases proportionally with the distance from the light source; and alternatively, when the color compensation pattern comprises yellow fluorescent pigments, the percentage of the yellow fluorescent pigment decreases proportionally with the distance from the light source.

The ink printing pattern comprises dots that are of a fixed size.

The ink printing pattern and the color compensation pattern are configured into a single layer configuration, and the printing pattern and the color compensation pattern are alternatively arranged across the bottom surface of the waveguide.

The printing pattern and the color compensation pattern are stacked into two layers, and the color compensation pattern is arranged on a first layer of the bottom surface of the waveguide, and the ink printing pattern is located on a second layer of the bottom surface of the waveguide.

The printing pattern and the color compensation pattern are stacked into two layers, wherein the ink printing pattern is located on a first layer of the bottom surface of the waveguide, and the color compensation pattern is arranged on a second layer of the bottom surface of the waveguide.

The bottom surface of the waveguide includes a pattern composed of ink and color pigment, and the percentage of the pigment within the pattern changes proportionally with the distance from the light source.

When the pigment is blue pigment, the percentage of the blue pigment within the pattern increases proportionally with the distance from the light source; and alternatively, when the pigment is yellow pigment, the percentage of the yellow pigment within the printing pattern decreases proportionally with the distance from the light source.

The present invention can be concluded with the following advantages. As compared with the existing prior arts, the reflector is coated with a pigment layer graduating from yellow to blue so as to provide a color correction with the waveguide in a way that the projected light beam therefrom has a uniform color thereby reducing the chromatic aberration.

DETAILED DESCRIPTION OF THE PREFERRED EMBODIMENTS

Figure 1:
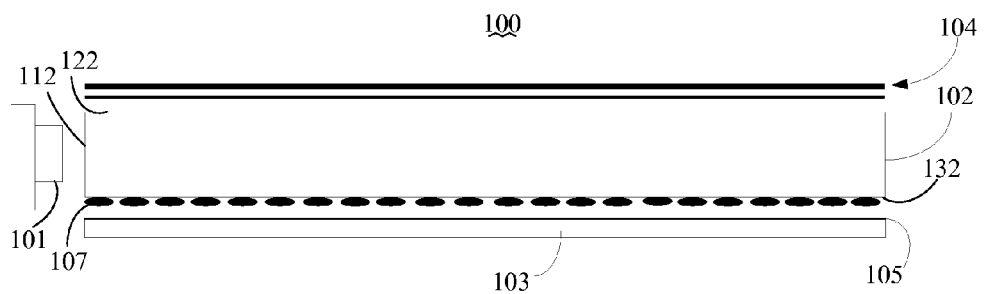
FIG. 1 is a cross-sectional view of a liquid crystal display device made in accordance with a first embodiment of the present invention.

Referring to FIG. 1, a cross-sectional view of a liquid crystal display device made in accordance with a first embodiment of the present invention is shown. The backlight module 10 includes a light source 101, a waveguide 102, a reflector 103, and an optical film 104. The waveguide 102 includes a light inlet surface 112, a light emitting surface 122, which is adjacent to the light inlet surface 112 and almost perpendicular to each other, and a bottom surface 132, which is opposite to the light emitting surface 122. The light inlet surface 112 is facing toward the light source 101. The bottom surface 132 includes a layer of ink printing pattern 107.

The optical film is disposed above the light emitting surface 122 of the waveguide 102 and can be embodied as a diffuser or a light enhancer.

The reflector 103 is disposed under the bottom surface 132 of the waveguide 102, and the reflector is coated with a layer of pigment of color gradation 105, which graduates from yellow to blue. The function of this color gradation layer is to provide selective absorption of light incident onto the reflector 103 so as to provide a homogeneous color distribution.

In a preferred embodiment of the present invention, the percentage of blue pigment within the color gradation 105 increases proportionally with a distance from the light source 101.

Figure 2:
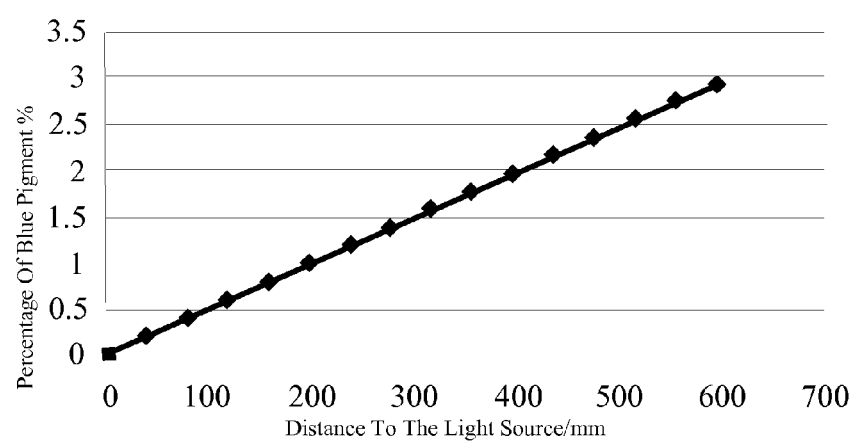
FIG. 2 is a diagram illustrating a variation of the percentage of a blue pigment, which varies proportionally with a distance from a light source.

FIG. 2 is a diagram illustrating a variation of the percentage of blue pigment, which varies proportionally with the distance from the light source. As shown in FIG. 2, the horizontal axis illustrates the distance from the light source 101, i.e. it shows a distance between the blue pigment and the light source 101, the unit being millimeter. The vertical axis represents the percentage of the blue pigment within the color gradation layer 105.

In this preferred embodiment, since the bottom surface 132 of the waveguide 102 is coated with an ink printing pattern layer 107, which may absorb and diffuse incoming light. In addition, the ink printing pattern layer 107 has stronger absorption to the light of short wavelength than that of longer wavelength, such as green light and blue light instead of red light.

Thus, for a site closer to the light source 101, the distance for light emitting from the light source 101 to travel within the waveguide 102 is shorter and thus, the amount of light of shorter wavelength absorbed by the waveguide 102 is less. As a result, the loss of the green light and blue light of the shorter wavelength is comparably smaller. Accordingly, in this area, the percentage of the blue pigment can be reduced, and this is the reason when the percentage of the blue pigment is smaller as it is closer to the light source 101.

When the distance between the blue pigment and the light source 101 is zero (0), the percentage of the blue pigment is zero.

As the light travels within the waveguide 102, the absorption of light with shorter wavelength becomes more and more evident and the color gradates from blue to yellow. Accordingly, the percentage of blue pigment has to increase so as to compensate the yellowish light. In light of this, the percentage of the blue pigment within the color gradation layer 105 increases as it becomes distant from the light source 101 so as to absorb those additional yellowish light incident to the reflector 103. As a result, homogeneous light with uniform color can be emitted from the backlight module 100.

Figure 3:
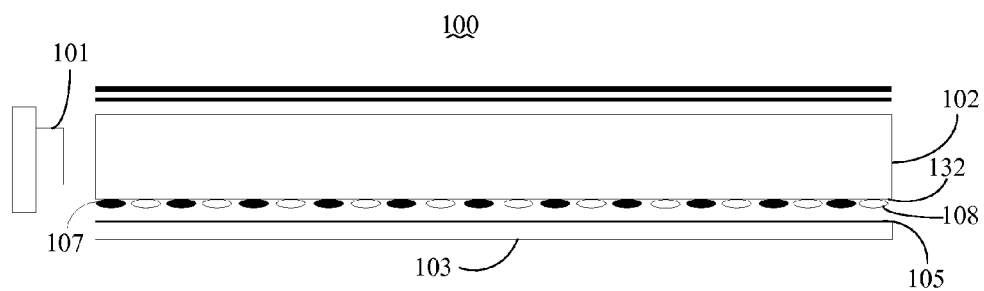
FIG. 3 is a cross-sectional view of a liquid crystal display device made in accordance with a second embodiment of the present invention.

FIG. 3 is a cross-sectional view of a liquid crystal display device made in accordance with a second embodiment of the present invention. The second embodiment provides an improvement over the first embodiment shown in FIG. 1. As shown in FIG. 3, the bottom surface 102 of the backlight module 100 further includes a color compensation pattern 108 alternatively arranged with the ink printing pattern 107.

Figure 5:
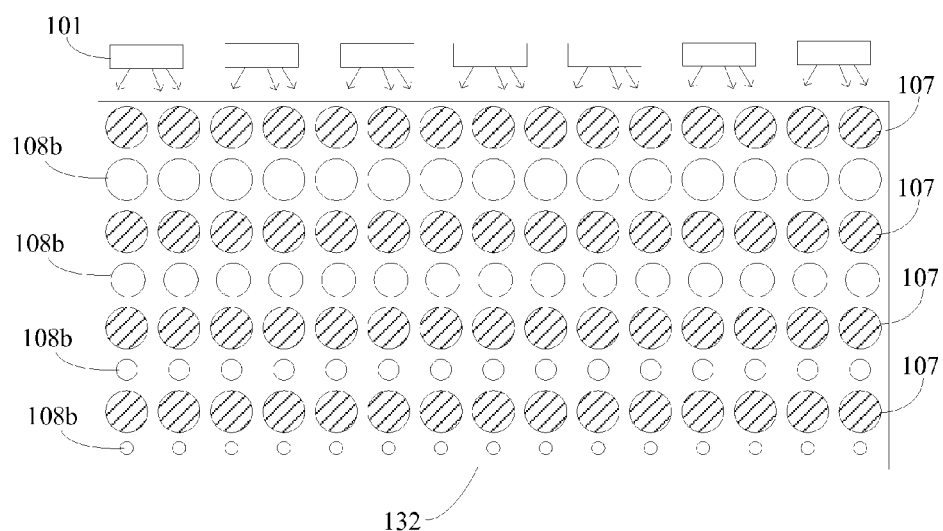
FIG. 5 illustrates a second embodiment of an arrangement of an ink printing pattern and a color compensation pattern shown in FIG. 3.
Figure 6:
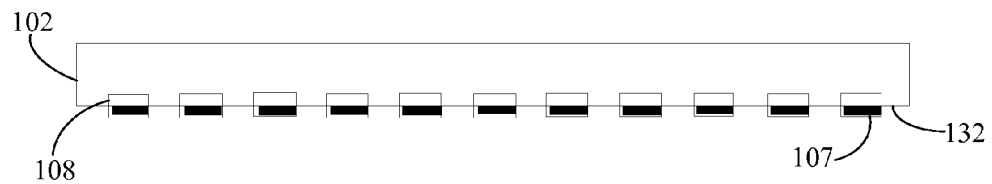
FIG. 6 illustrates a third embodiment of an arrangement of an ink printing pattern and a color compensation pattern shown in FIG. 3.

The color compensation pattern 108 is composed of fluorescent powder so as to generate a certain or preselected color based on the pigment used. Examples of arrangement between the ink printing pattern 107 and the color compensation pattern 108 are shown in FIGS. 4 to 6.

Figure 4:
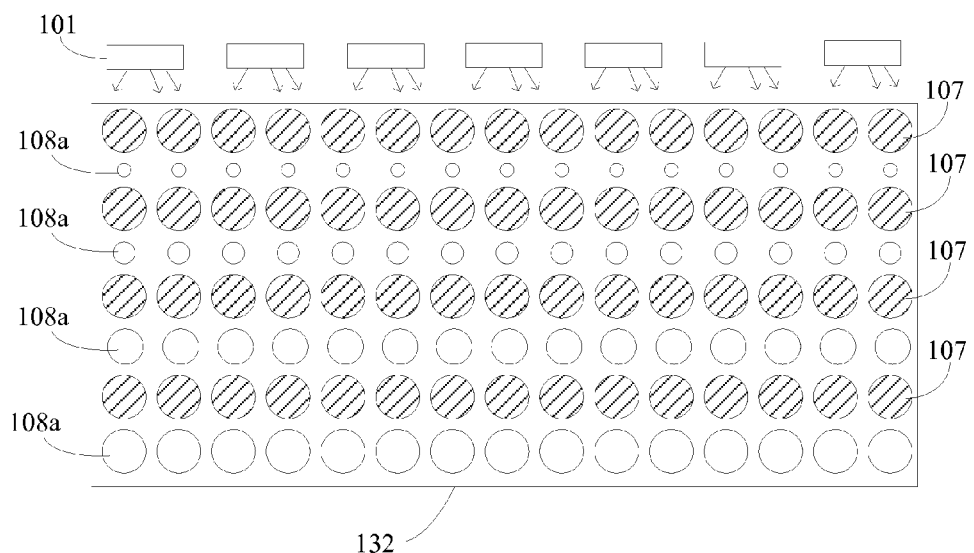
FIG. 4 illustrates a first embodiment of an arrangement of an ink printing pattern and a color compensation pattern shown in FIG. 3.

FIG. 4 illustrates a first example of an arrangement of an ink printing pattern and a color compensation pattern illustrated in FIG. 3. As shown in FIG. 4, the color compensation pattern 108 is formed of dots 108a of blue fluorescent pigment and comprises a single layer along with the ink printing pattern 107. Dots of the ink printing pattern 107 and the blue fluorescent dots 108a are alternately distributed across the bottom surface 132 of the waveguide 102. In other words, the ink printing pattern 107 configures a row, while the blue fluorescent pigment 108a configures another row, and they are alternately distributed across the bottom surface 132 of the waveguide 102. The specific arrangement will be further described as below.

The ink printing pattern 107 is arranged to a side on the waveguide 102 closest to the waveguide 102. As a result, a first row of the ink printing pattern 107 is formed. Then, a row, which is located at a preselected distance from the first row, of blue fluorescent patterns 108a is formed. In this embodiment, the size or dimension of the ink printing patterns 107 remains unchanged across the waveguide 102, while the size or dimension of the blue fluorescent pigment 108a increases as it becomes distant from the light source 101.

The working principle of the arrangement of the ink printing patterns 107 and the blue fluorescent pigments 108a will be better described as below.

During the travel of the light from the light source 101 within the waveguide 102, the percentage of the light with shorter wavelength becomes fewer and fewer, and accordingly, the color of the light gradates from bluish to yellowish. Accordingly, in order to stabilize the bluish color of the light through out of its travel within the waveguide 102, the proportion between the bluish light and the yellowish light has to be remained to a constant so as to ensure the light coming out of the waveguide 102 remains unchanged. In the present embodiment, since at a location closer to the light source 100, the path that the inlet light travels within the waveguide 102 is not longer, the absorption of the light fraction with shorter wavelength is not apparent, and as a result, only some blue fluorescent pigment with small size or dimension will be good enough to serve the purpose. However, while the path of light travelling within the waveguide 102 becomes longer and longer, the absorption of the light with shorter wavelength becomes more and more apparent, and the color of the light becomes yellowish, and it needs more blue fluorescent pigments to compensate. As a result, the size or dimension of the blue fluorescent pigments 108a becomes larger and larger.

In this embodiment, the size or dimension of the ink printing pattern 107 can be remained unchanged, while it can also make some alternation according to the actual requirements. As result, no further description is given.

FIG. 5 illustrates a second example of an arrangement of an ink printing pattern and a color compensation pattern shown in FIG. 3. The difference between FIGS. 4 and 5 is that in FIG. 5, the color compensation patterns 108b is a yellow fluorescent pigments, and it has the largest size or dimension closet to the slight source 101. However, as it becomes distant from the light source 101, the size or dimension of the yellow fluorescent pigments 108b becomes smaller.

In this embodiment, when the light from the light source 101 hits the yellow fluorescent pigments 108b, the color of the light will turn yellowish. Since at the location close to the light source 101, the path that light travels within the waveguide 102 is not long, the absorption of the light fraction with shorter wavelength is not apparent, and as a result, the light is still bluish. Accordingly, the size or dimension of the yellow fluorescent pigment 108b is comparably larger so as to compensate the color. With the light transmitting further through the waveguide 102, the absorption of the light by the ink printing pattern 107 becomes more and more, and the light within the waveguide 102 becomes yellowish. With the necessity of the color compensation reduces gradually, the size or dimension of the yellow fluorescent pattern 108b becomes smaller and smaller.

In this embodiment, the size or dimension of the ink printing pattern 107 can be remained unchanged, while it can also make some alternation according to the actual requirements. As result, no further description is given.

Referring to FIG. 6, a third example of an arrangement of an ink printing pattern and a color compensation pattern shown in FIG. 3 is illustrated. In FIG. 6, the ink printing pattern 107 and the color compensation pattern 108 are stacked into two layers over the bottom surface 132 of the waveguide 102. The color compensation pattern 108 is deployed firstly over an internal side of the bottom surface 132 of the waveguide 102, and then the ink printing pattern 107 is deployed over an external side of the bottom surface 132 of the waveguide. Both are separated from each other without any interference. This is preferable for making waveguide 102 and is beneficial to the yield.

Alternatively, the locations of the ink printing pattern 107 and the color compensation pattern 108 can be exchanged from each other, i.e. the internal side of the bottom surface being deployed with ink printing pattern 107, while the external side of the bottom surface 132 can be deployed with color compensation pattern 108.

It can be readily understood that the color compensation patterns 108 can be embodied as the blue fluorescent pattern 108a, or the yellow fluorescent pattern 108b. In addition, the size or dimension of those patterns 108a and 108b across internal and external sides of the bottom surface 132 of the waveguide 102 can be determined according to the above description in view of FIGS. 4 and 5. As a result, no detailed description is given.

Figure 7:
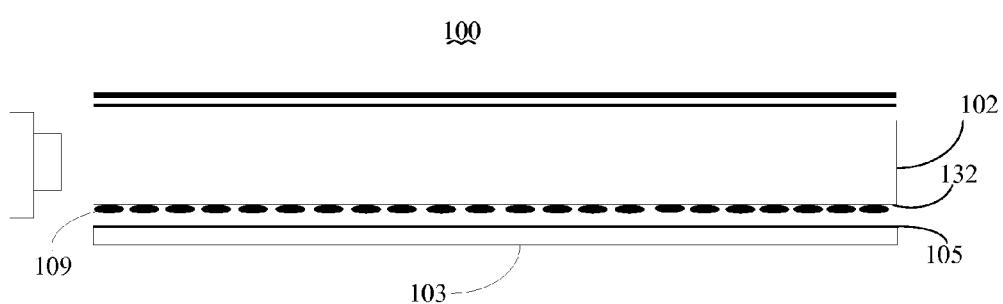
FIG. 7 is a cross-sectional view of a liquid crystal display device made in accordance with a third embodiment of the present invention.

FIG. 7 is a cross-sectional view of a liquid crystal display device made in accordance with a third embodiment of the present invention. This is an improvement over the first embodiment of the backlight module 100 discussed above.

Specifically, as shown in FIG. 7, the bottom surface 132 of the waveguide 102 of the backlight module 100 further includes a pattern composed by the ink pattern and color pigment.

Figure 8:
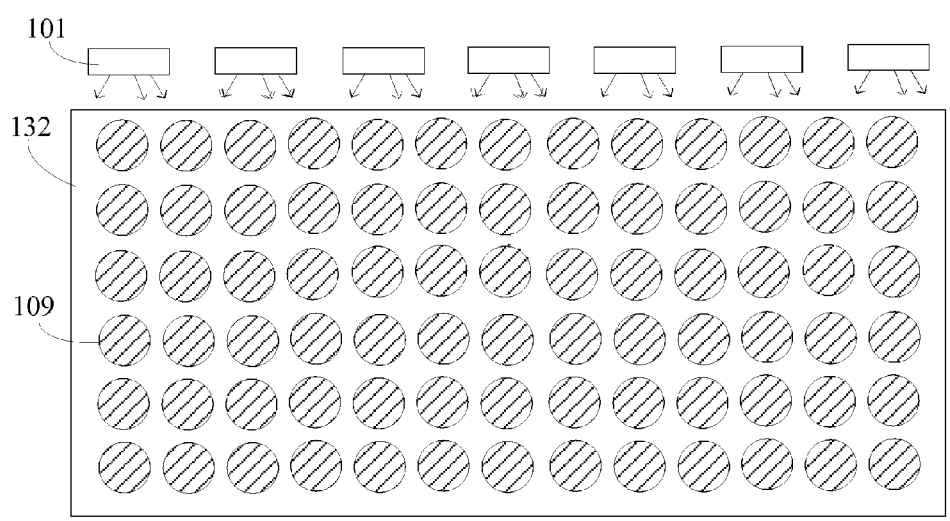
FIG. 8 illustrates a pattern composed of an ink printing pattern and a color compensation pattern of FIG. 7.

FIG. 8 is an illustration of the pattern 109 composed by the ink printing patterns and the color compensation patterns. As shown in FIG. 8, the size of the pattern 109 remains unchanged, and is evenly distributed across the bottom surface 132 of the waveguide 102. There is no special requirement to the size or dimension of the pattern 109, and it can be decided according to the field requirement. In the preferred embodiment, the diameter of dots, which form the pattern 109 varies from 0.2 to 0.4 millimeter. Specifically, it can be selected to have a diameter of 0.2 millimeter, and preferably, it can be 0.4 millimeter. Since there is a great deal of dots that form the pattern 109, and only a typical and simplified pattern 109 is illustrated.

In this embodiment, the color pigment of the pattern 109 is blue particle, which is made from blue pigment. The percentage or density of the blue pigment within the pattern 109 increases as it becomes distant from the light source 101. That is to say, the percentage of the blue pigment within the pattern 109 varies proportionally with the distance from the light source 101. The variation is very much like to what disclosed in FIG. 2. Its working principle is also the same, and no further description is given accordingly.

In this embodiment, the color pigment within the pattern 109 can be yellow particle, which is made from yellow fluorescent powder. In addition, the percentage of the yellow pigment within the pattern 109 varies as the pattern 109 becomes distant from the light source 101. See FIG. 9 for details.

Figure 9:
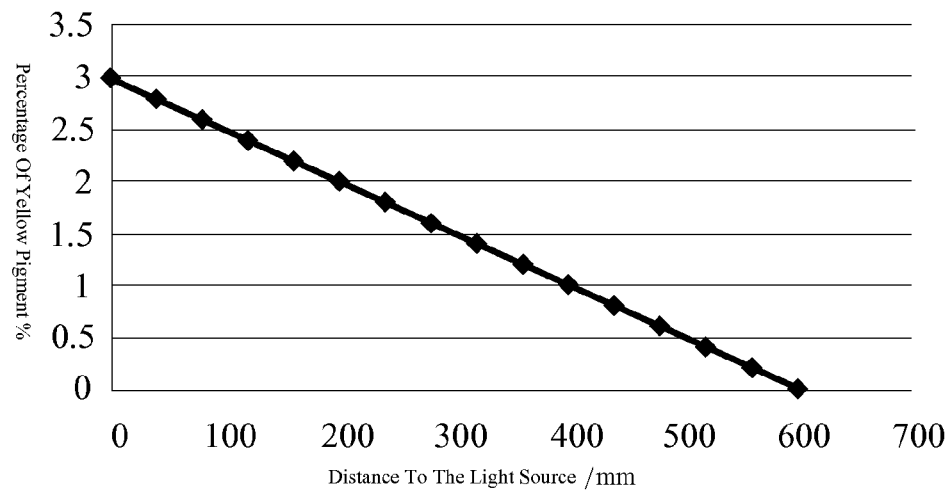
FIG. 9 is a diagram illustrating a variation of the percentage of yellow fluorescent pigment, which varies proportionally with a distance from a light source.

FIG. 9 is a diagram illustrating a variation of the percentage of yellow pigment shown in FIG. 7, which varies proportionally with a distance from a light source 101. As shown in FIG. 9, the horizontal axis illustrates the distance of pattern 9 from the light source 101, i.e. it shows a distance between the yellow pigment and the light source 101, the unit being millimeter. The vertical axis represents the percentage of the yellow pigment within the pattern 109, and the percentage decreases as the distance from the light source 101 become distant.

From the analysis discussed above, it can be readily appreciated that the closer to the light source 101, the fewer the absorption of the light from the light source 101 by the waveguide 102. Accordingly, in this stage, the light is still bluish, and there is a need for yellow pigment to compensate the bluish light, i.e. this means the percentage of the yellow pigment has to be increased.

In this preferred embodiment, the largest percentage of the yellow fluorescent powder is 3%. However, with the light traveling within the waveguide 102, the light with shorter wavelength absorbed by the waveguide 102 becomes more and more, and the light will become yellowish. Accordingly, no much compensation of the yellow fluorescent powder is needed, and the percentage or density of the yellow fluorescent powder is reduced gradually.

In this embodiment, when a distance of 600 millimeter between the pattern 109 and the light source 101 is measured, there is no need of any yellowish color compensation within the waveguide 102.

Figure 10:
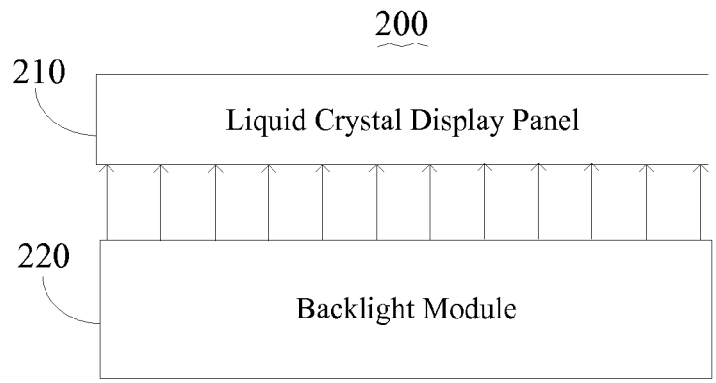
FIG. 10 is an illustration of a liquid crystal display device incorporated with the backlight module made in accordance with the present invention.

FIG. 10 is an illustration of a liquid crystal display device incorporated with the backlight module made in accordance with the present invention. As shown in FIG. 10, the liquid crystal display device 200 is incorporated with a liquid crystal display panel 210 and a backlight module 220. The panel 210 is disposed above the backlight module 220 so as to be lit up by the backlight module 220.

In this embodiment, the backlight module 220 can be embodied by any of above described backlight module 100 such that uniform and homogeneous light is projected from the backlight module so as to reduce the chromatic aberration.

In conclusion, the reflector made in accordance with the present invention is coated with a pigment layer gradating from yellow to blue. In addition, the bottom surface of the waveguide is deployed with ink printing pattern and color compensation pattern, or deployed with pattern composed by ink and color particle. A color correction with the waveguide in a way that the projected light therefrom has a uniform color thereby reducing the chromatic aberration.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:
1. A backlight module, comprising:
   a light source;
   a waveguide including an light inlet surface facing the light source, an light emitting surface adjacent to the light inlet surface, and a bottom surface opposite to the light emitting surface;
   a reflector disposed under the bottom surface of the waveguide;
   an optical film disposed above the light emitting surface of the waveguide;
   wherein the reflector is coated with a gradation color layer composed by yellow graduating to blue and the graduation color layer comprises blue pigment having a percentage that proportionally increases with distance from the light source;
   wherein the bottom surface of the waveguide includes a printing pattern comprising a plurality of dots spaced from each other and each formed of a mixture of ink and pigments that comprise at least one of a blue pigment and a yellow pigment so that a percentage of at least one of the pigments within the dots of the printing pattern changes proportionally with the distance from the light source;
   wherein the percentage of the blue pigment within the dots of the printing pattern increases proportionally with the distance from the light source; and alternatively, the percentage of the yellow pigment within the dots of the printing pattern decreases proportionally with the distance from the light source; and
   wherein the bottom surface of the waveguide further includes a color compensation pattern that comprises a plurality of dots formed of fluorescent pigments including at least one of a blue fluorescent pigment and a yellow fluorescent pigment, wherein the dots of the blue fluorescent pigment of the color compensation pattern have sizes that increase when the distance from the light source increases; and alternatively, the dots of the yellow fluorescent pigment of the color compensation pattern have sizes that decrease when the distance from the light source increases.

2. The backlight module as recited in claim 1, wherein the dots of the printing pattern are of the same size.

3. The backlight module as recited in claim 1, wherein the printing pattern and the color compensation pattern are configured as a single layer and the dots of the printing pattern and the dots of the color compensation patterns alternate with each other across the bottom surface of the waveguide.

4. The backlight module as recited in claim 1, wherein the printing pattern and the color compensation pattern are stacked as two layers, of which the first layer is formed on the bottom surface of the waveguide and comprises the color compensation pattern and the second layer is formed on the first layer and comprises the ink printing pattern.

5. The backlight module as recited in claim 1, wherein the printing pattern and the color compensation pattern are stacked as two layers, of which the first layer is formed on the bottom surface of the waveguide and comprises the printing pattern and the second layer is formed on the first layer and comprises the color compensation pattern.

6. A liquid crystal display device, comprising:
 a liquid crystal display panel; and
 a backlight module, including:
 a light source,
 a waveguide including an light inlet surface facing the light source, and an light emitting surface being adjacent to the light inlet surface, and a bottom surface opposite to the light emitting surface,
 a reflector disposed under the bottom surface of the waveguide, and
 an optical film disposed above the light emitting surface of the waveguide;
 wherein the reflector is coated with a gradation color layer composed by yellow graduating to blue and the graduation color layer comprises blue pigment having a percentage that proportionally increases with distance from the light source;
 wherein the bottom surface of the waveguide includes a printing pattern comprising a plurality of dots spaced from each other and each formed of a mixture of ink and pigments that comprise at least one of a blue pigment and a yellow pigment so that a percentage of at least one of the pigments within the dots of the printing pattern changes proportionally with the distance from the light source;
 wherein the percentage of the blue pigment within the dots of the printing pattern increases proportionally with the distance from the light source; and alternatively, the percentage of the yellow pigment within the dots of the printing pattern decreases proportionally with the distance from the light source; and
 wherein the bottom surface of the waveguide further includes a color compensation pattern that comprises a plurality of dots formed of fluorescent pigments including at least one of a blue fluorescent pigment and a yellow fluorescent pigment, wherein the dots of the blue fluorescent pigment of the color compensation pattern have sizes that increase when the distance from the light source increases; and alternatively, the dots of the yellow fluorescent pigment of the color compensation pattern have sizes that decrease when the distance from the light source increases.

7. The liquid crystal display device as recited in claim 6, wherein the dots of the printing pattern are of the same size.

8. The liquid crystal display device as recited in claim 6, wherein the printing pattern and the color compensation pattern are configured as a single layer and the dots of the printing pattern and the dots of the color compensation patterns alternate with each other across the bottom surface of the waveguide.

9. The liquid crystal display device as recited in claim 6, wherein the printing pattern and the color compensation pattern are stacked as two layers, of which the first layer is formed on the bottom surface of the waveguide and comprises the color compensation pattern and the second layer is formed on the first layer and comprises the ink printing pattern.

10. The liquid crystal display device as recited in claim 6, wherein the printing pattern and the color compensation pattern are stacked as two layers, of which the first layer is formed on the bottom surface of the waveguide and comprises the printing pattern and the second layer is formed on the first layer and comprises the color compensation pattern.

\* \* \* \* \*